United States Patent [19]

Gleason, deceased et al.

[11] Patent Number: 4,838,029

[45] Date of Patent: Jun. 13, 1989

[54] EXTERNALLY VAPORIZING SYSTEM FOR TURBINE COMBUSTOR

[75] Inventors: Clifford C. Gleason, deceased, late of Cincinnati, Ohio, by Mary J. Gleason, executor; Edward E. Ekstedt, Montgomery, Ohio

[73] Assignee: The United States of America as represented by the Secretary of the Air Force, Washington, D.C.

[21] Appl. No.: 905,439

[22] Filed: Sep. 10, 1986

[51] Int. Cl.[4] .......... F02C 1/00

[52] U.S. Cl. .......... 60/732; 60/736

[58] Field of Search .......... 60/732, 733, 736, 737, 60/738, 748

[56] References Cited

U.S. PATENT DOCUMENTS

| | | | |
|---|---|---|---|
| 2,059,523 | 11/1936 | Hepburn et al. | 60/732 |
| 2,404,335 | 7/1946 | Whittle | 60/44 |
| 2,479,776 | 8/1949 | Price | 60/35.6 |
| 2,999,359 | 9/1961 | Murray | 60/733 |
| 3,869,865 | 3/1975 | Lacroix et al. | 60/39.66 |
| 4,040,252 | 8/1977 | Mosièr et al. | 60/39.36 |
| 4,179,881 | 12/1979 | Faucher et al. | 60/39.71 |
| 4,262,482 | 4/1981 | Roffe et al. | 60/736 |
| 4,409,786 | 10/1983 | Hamrick et al. | 60/736 |

FOREIGN PATENT DOCUMENTS

| | | | |
|---|---|---|---|
| 2146425 | 4/1985 | United Kingdom | 60/733 |

*Primary Examiner*—Carlton R. Croyle
*Assistant Examiner*—Timothy S. Thorpe
*Attorney, Agent, or Firm*—Stanton E. Collier; Donald J. Singer

[57] ABSTRACT

The externally vaporizing system of the present invention incorporates an auxiliary burner which is supplied with compressor discharge air at a rate which is regulated to the main fuel flow rate. The auxiliary burner is operated at approximately stoichiometric fuel-air ratio, in order to provide very-hot, nearly-inert gases for vaporizing the main fuel supply. The main fuel is sprayed in the auxiliary burner exit gas stream where rapid mixing and evaporation occur. The resulting vaporized fuel/inert gas mixture (at about 800° F., preferably) is then ducted and distributed to the individual main combustor fuel injectors where it is injected into the premixing ducts.

1 Claim, 2 Drawing Sheets

EXTERNALLY VAPORIZING SYSTEM FOR TURBINE COMBUSTOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to turbine engines, and, in particular, relates to a combustor therein.

Many of the most commonly used fuels, such as heavy hydrocarbons, display physical and chemical properties which require great care in the implementation of a prevaporizing and premixing process. For example, complete vaporizing of commercial number 2 heating oil requires that the fuel temperature be raised to approximately 650° F. Further increases in temperature simply assure the gassified state of the fuel. However, at temperatures as low as 900° F., the vaporized fuel begins to break down, chemically forming molecules of both higher and lower molecular weight than that of the original fuel. The new heavy molecules are highly undesirable components as they cause clogging of the vaporizer fuel passages and injectors and produce high particulate emission levels when they burn. Thus, the range of temperature available for the vaporization process is quite narrow and requires very careful control.

The chemical breakdown (pyrolysis) limit on fuel vaporization temperature leads to a second important problem. Although the fuel may be prevaporized, its heat content is insufficient to prevent some degree of recondensation if it is mixed with a stream of colder air. Although this partial recondensation results in extremely fine fog-like liquid droplets, the combustion properties of the system are degraded in comparison with the all gas-phase process. In addition, agglomeration can take place within the fog to produce larger droplets still and fuel can condense along the walls of the apparatus further degrading the combustion characteristics of the system.

The premixed combustion of prevaporized liquid fuels has been the object of previous inventions. In U.S. Pat. No. 4,008,041, careful control of temperature during the vaporization process was accomplished by utilization of an intermediate heat transfer fluid. In U.S. Pat. No. 4,089,638, the need for an intermediate fluid was eliminated by locating a fuel vaporization coil downstream of the point of flame initiation but sufficiently early in the reaction to avoid subjecting the coil to excessive temperatures.

Numerous studies have shown that low levels of nitrogen oxides ($NO_x$) and smoke emissions, as well as reduced flame radiation levels, can be achieved with lean premixed-prevaporized (LPP) combustion systems. One prior combustor is a single stage lean premixed-prevaporized combustor with conventional flameholder/reactor. Another is a parallel stage combustor with lean premixed-prevaporized catalytic reactor main stage. Several problems have been identified with this arrangement:

(1) A relatively large number of well metered fuel injection points are needed in order to obtain an initially uniform spatial fuel distribution. The fuel injectors, therefore, tend to be mechanically complex, and prone to fouling, which can cause the spatial uniformity to deteriorate with operation;

(2) At modern high-pressure ratio gas turbine operating conditions, ignition delay times are very short—on the order of 1-2 milliseconds, so potentially destructive combustion in the premixing duct is a concern. The duct must be very short, aerodynamically clean, and flow surges must be avoided; and (3) A high degree of fuel vaporization must be achieved in order to realize the LPP combustion benefits. Complete vaporization is difficult to obtain without encountering autoignition when current heavier fuels are used. Further, because of dwindling petroleum resources and increased demands, future fuels are expected to have increased boiling ranges, which will make it more difficult to achieve a high degree of vaporization.

The use of a normally gaseous fuel (such as natural gas or propane) largely overcomes these problems, since (1) the gaseous fuel metering orifices are much larger and therefore less prone to fouling, and (2) the premixing duct then only needs to be long enough to achieve the desired degree of fuel-air mixing uniformity.

The present invention is directed toward providing a combustor in which the undesirable characteristics of prior liquid fuel systems are overcome in light of the advantages of a purely gaseous system.

SUMMARY OF THE INVENTION

The present invention sets forth an externally vaporizing system for a liquid fueled lean premixed-prevaporized combustion system wherein heat is supplied to the fuel by direct mixing with hot inert gases thereby achieving a more compact and simple system.

The externally vaporizing system incorporates an auxiliary burner which is supplied with compressor discharge air at a rate which is regulated to the main fuel flow rate. The auxiliary burner is operated at approximately stoichiometric fuel air-ratios, in order to provide very-hot, nearly-inert gases for vaporizing the main fuel supply. The main fuel is injected into the auxiliary burner exit gas stream where rapid mixing and evaporation occur. The resulting vaporized fuel/inert gas mixture (at about 800° F., preferably) is then ducted and distributed to the individual main combustor fuel injectors where it is injected into the premixing ducts feeding the main combustor.

It is therefore one object of the present invention to provide an externally vaporizing system for a combustor;

It is therefore another object of the present invention to provide an externally vaporizing system that is very compact;

It is therefore another object of the present invention to provide an externally vaporizing system such that completely vaporized fuel can be generated at all engine operating conditions; and It is therefore another object of the present invention to provide an externally vaporizing system such that no valves, or small passages are required in the main vaporized fuel injection.

These and many objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
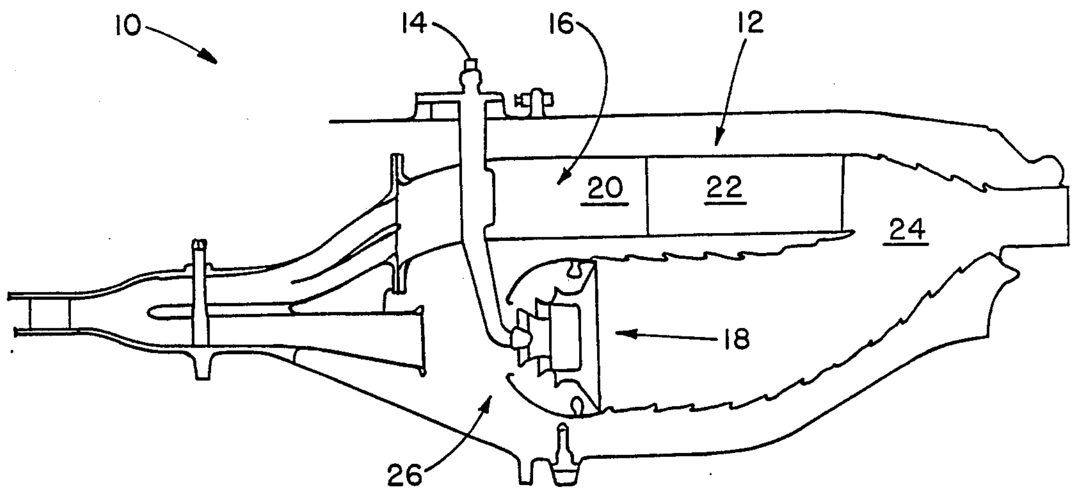
FIG. 1 PRIOR ART
FIGS. 1 and 2 are prior art combustors having a lean premixed-prevaporized system therein.

Referring to FIG. 1, a prior art parallel staged combustor 10 is shown which has a lean premixed-prevaporized catalytic reactor main stage 12. A liquid fuel injector 14 outputs through a first set 16 of nozzles and a second set 18 of nozzles. Following first set 16 is a premixing duct 20 after which is a catalytic reactor 22 which vaporizes the premixed fuel. Combustion of the premixed and prevaporized fuel occurs in combustion chamber 24. A pilot burner 26 having second set 18 of injectors is provided in combustor 10.

Figure 2:
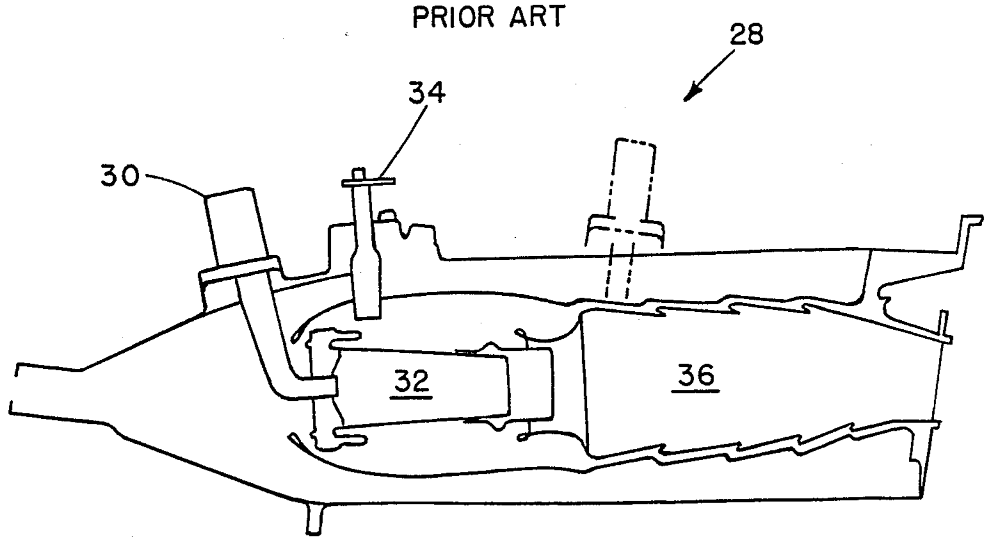
FIG. 2 PRIOR ART

FIG. 2 illustrates a single stage combustor 28 having a fuel injector 30 inputting fuel into a premixing duct 32 having an igniter 34. Complete burning occurs in a combustion chamber 36 when additional air is added.

Figure 3:
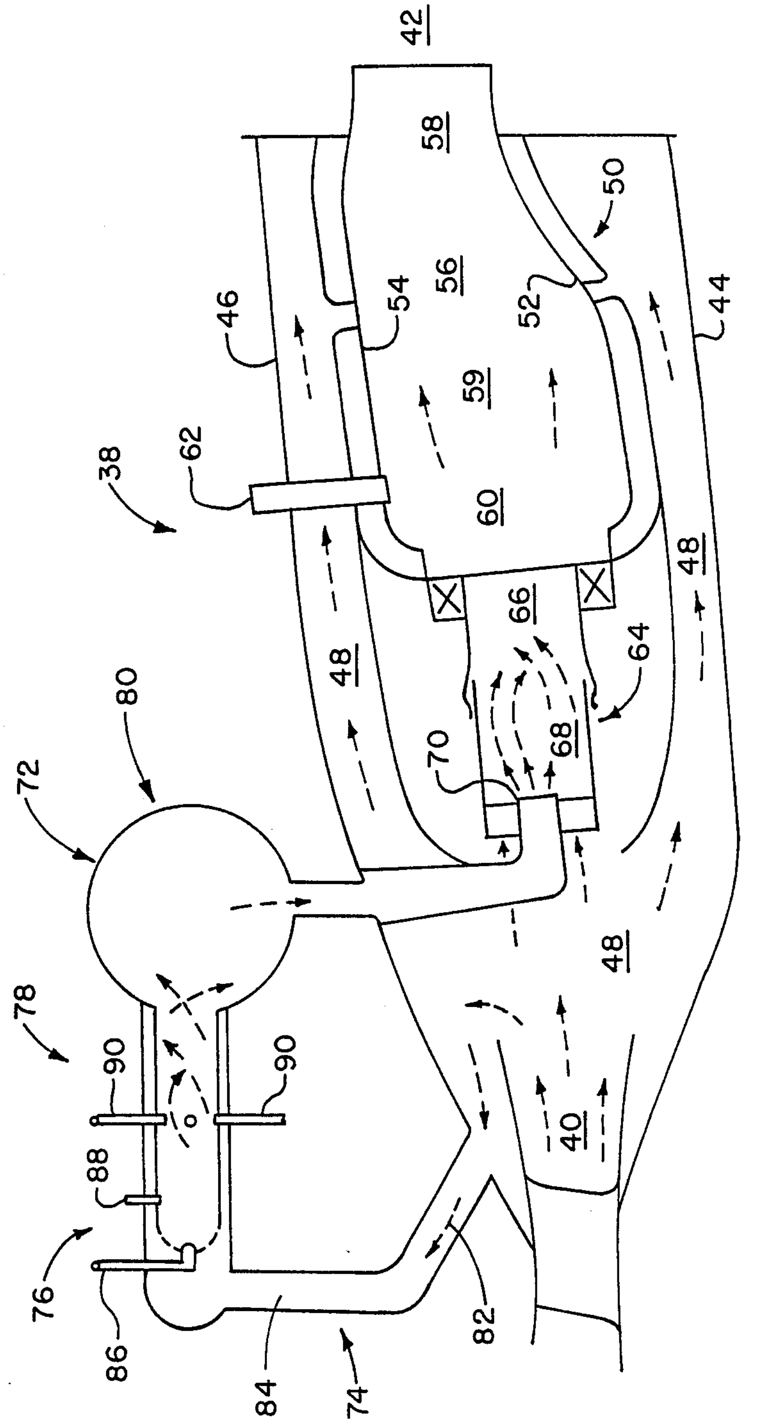
FIG. 3 illustrates schematically the externally vaporizing system of the present invention.

The present invention is illustrated in FIG. 3 as a combustor 38. Combustor 38 is situated downstream of a diffuser section 40 and upstream of a turbine section 42, not shown, being conventional.

The combustor 38 includes an inner annular casing 44 and an outer annular casing 46 forming an annular space 48 therebetween. Disposed within the annular space 48 is an annular combustion chamber 50. The combustion chamber 50 is constructed with an inner annular wall 52 and an outer annular wall 54 defining an annulus 56 therebetween being a conventional combustion chamber 50. The walls 52 and 54 also form an annular outlet 58 at the downstream end of the combustion chamber 50 for directing combustion products into the turbine section 42. The upstream portion 60 of the annulus 56 is the primary combustion zone. Mounted on the outer annular casing 46 and extending into the primary combustion zone 60 is ignition means 62 which is shown herein to be a conventional spark igniter. The ignition means 62 is mounted in the outer annular casing 46.

Additionally, a plurality of premixing ducts/swirlers 64 are uniformly spaced about combustion chamber 50. An output end 66 of premixing ducts/swirlers 64 is connected to primary combustion zone 60. An input end 68 has fuel injectors 70 therein.

A plurality of externally vaporizing systems 72 are positioned about casings 46. Although, one externally vaporizing system 72 may be sufficient. Externally vaporizing system 72 has a flow control section 74, an auxiliary burner section 76, a main stage fuel injector section 78 that feeds into a vaporized fuel manifold 80. The vaporized fuel is then input into a plurality of fuel injectors 70. A single vaporized fuel manifold 80 may feed several fuel injectors 70.

Externally vaporizing system 72 draws a small fraction of input air 82, under pressure, into flow control section 74 wherein a throttle plate 84 is connected to a control means, not further shown, that moves in response to operating conditions. The input air 82 enters auxiliary burner 76 having a pressure atomizing fuel nozzle 86 and an igniter 88 wherein an approximate stoichiometric fuel-air ratio is established in order to provide very hot, nearly inert gases for vaporizing and mixing main fuel input by a plurality of injectors 90 in the main stage fuel injector section 78. The resulting vaporized fuel/inert gas mixture at about 800° F., preferably, is then input to fuel manifold 80 where it is distributed to individual main combustor fuel injectors 70 where it is injected into the premixing ducts/swirlers 64.

The externally vaporizing system 72 may be very compact since about only one percent of the main combustor air flow is needed in the auxiliary burner to completely vaporize and heat the main fuel to about 800° F.; completely vaporized fuel can be generated at all engine operating conditions because externally vaporizing system 72 is essentially independent of externally vaporizing system 72 is essentially independent of the main combustor 38; because the fuel input to premixing ducts/swirlers 64 is vaporized to a maximum level, no valves or small passages are required in the main vaporized fuel injectors 70 which would normally be prone to fouling and plugging.

Clearly, many modifications and variations of the present invention are possible in light of the above teachings and it is therefore understood, that within the inventive scope of the inventive concept, the invention may be practiced otherwise than specifically claimed.

What is claimed is:

1. A lean premixed-prevaorized combustor for a jet turbine engine, said combustor being located between a compressor section having a diffuser and a turbine section, said combustor comprising:
   - an inner annular casing;
   - an outer annular casing, said inner and said outer annular casings being connected together to form an annular space therebetween, said casings being connected to said diffuser of said compressor and said turbine section whereby air flows through said combustor;
   - an inner annular wall,
   - an outer annular wall, said inner and said outer annular walls being connected together and located in said annular space of said casings, said walls forming an annulus shaped combustion chamber, said combustion chamber having a primary combustion zone and an annular outlet;
   - premixing and swirling means, said premixing and swirling means having input and output ends, said output end connected to said combustion chamber, said input end receiving air form said diffuser; and
   - an externally vaporizing system including a source of liquid fuel to be vaporized, said externally vaporizing system being located outside said casings, said externally vaporizing system receiving input air in a controlled manner, said system vaporizing said liquid fuel and inputting said fuel into said means for pre-mixing and swirling,
   - at least one air flow control means, said air flow control means receiving said input air;
   - at least one auxiliary burner,
   - air from said air flow control means being supplied to said burner at substantially a stoichiometric fuel-air ratio whereby, said axuiliary burner outputs fuel-/inert gas mixture;
   - at least one main stage fuel injector section, said injector section having a plurality of main fuel injectors, said at least one main state fuel injector section receiving said fuel/inert gas mixture from said auxiliary burners, said injector section outputing vaporized fuel;
   - a vaporized fuel manifold, said manifold receiving said vaporized fuel and distributing by ducting said vaporized fuel in a controlled manner: and
   - a plurality of vaporized fuel injectors, said vaporized fuel injectors receiving said distributed vaporized fuel from said manifold, said injectors inputting said vaporized fuel into said means for premixing and swirling.

* * * * *